United States Patent
Yoon et al.

(10) Patent No.: US 10,025,531 B2
(45) Date of Patent: Jul. 17, 2018

(54) REDUCING READ COMMAND LATENCY IN STORAGE DEVICES

(71) Applicant: HoneycombData Inc., Santa Clara, CA (US)

(72) Inventors: Jongman Yoon, San Jose, CA (US); Sushma Devendrappa, San Jose, CA (US); Xiangyong Ouyang, South San Francisco, CA (US)

(73) Assignee: HONEYCOMBDATA INC., Santa Clara, CA (US)

( * ) Notice: Subject to any disclaimer, the term of this patent is extended or adjusted under 35 U.S.C. 154(b) by 0 days.

(21) Appl. No.: 14/850,524

(22) Filed: Sep. 10, 2015

(65) Prior Publication Data

US 2017/0075570 A1    Mar. 16, 2017

(51) Int. Cl.
  *G06F 3/06*    (2006.01)
(52) U.S. Cl.
  CPC .......... *G06F 3/0659* (2013.01); *G06F 3/0611* (2013.01); *G06F 3/0679* (2013.01)
(58) Field of Classification Search
  CPC ....... G06F 3/0659; G06F 3/061; G06F 3/0688
  See application file for complete search history.

(56) References Cited

U.S. PATENT DOCUMENTS

| | | | |
|---|---|---|---|
| 5,623,629 A | 4/1997 | Suzuki | |
| 6,078,998 A | 6/2000 | Kamel | |
| 6,170,042 B1 | 1/2001 | Gaertner | |
| 6,745,262 B1 | 6/2004 | Benhase | |
| 7,310,711 B2 | 12/2007 | New | |
| 7,594,044 B2 | 9/2009 | Brewer | |
| 8,225,006 B1 * | 7/2012 | Karamcheti | G06F 11/108 710/5 |
| 8,539,176 B2 | 9/2013 | Molaro | |
| 2005/0066138 A1 | 3/2005 | Horn | |
| 2005/0273646 A1 * | 12/2005 | Hillier, III | G06F 11/106 714/5.1 |
| 2009/0100433 A1 | 4/2009 | Kang | |
| 2010/0049913 A1 | 2/2010 | Marcu | |
| 2010/0082547 A1 * | 4/2010 | Mace | G06F 11/1435 707/648 |
| 2012/0066449 A1 * | 3/2012 | Colgrove | G06F 3/061 711/114 |
| 2012/0159016 A1 * | 6/2012 | Morita | G06F 13/1673 710/33 |
| 2013/0031298 A1 | 1/2013 | Tan | |
| 2017/0060445 A1 * | 3/2017 | Yang | G06F 3/0616 |

* cited by examiner

*Primary Examiner* — Larry T Mackall
(74) *Attorney, Agent, or Firm* — David R. Stevens; Stevens Law Group

(57) ABSTRACT

A storage device, such as a NAND flash device, includes a controller that assigns host read commands to a high priority queue and all other I/O commands including host write commands to a low priority queue. The controller executes any commands in the high priority queue before executing commands in the low priority queue. Block write commands are broken into page write commands that are added to the low priority queue, thereby enabling any host read commands to be interleaved with execution of the page write commands, rather than waiting for completion of a block write command. Coherency between overlapping commands is performed by a host device coupled to the controller such that no checking of coherency is performed by the SSD controller.

16 Claims, 6 Drawing Sheets

REDUCING READ COMMAND LATENCY IN STORAGE DEVICES

BACKGROUND

Field of the Invention

This invention relates to systems and methods for storing and accessing data in a flash memory system.

Background of the Invention

Solid-state drives, also referred to as SSDs, are data storage devices that make use of NAND flash memory devices as storage elements. Typically they have a SSD controller that accepts host commands on one end and communicate to the NAND flash on the other. NAND flash is a type of non-volatile storage device that retains data when powered off. The SSD controller accesses the NAND flash device through the NAND interface.

A NAND flash device includes a plurality of flash-blocks or blocks each divided into a plurality of pages. NAND flash has a fundamental limitation on write operations: a flash page has to be erased before write can happen and erasure has to be done in flash-block granularity. Likewise, the actual write to the NAND flash device is much slower than a read command The apparatus and methods disclosed herein provide an improved approach for executing read and write commands in a NAND flash device.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
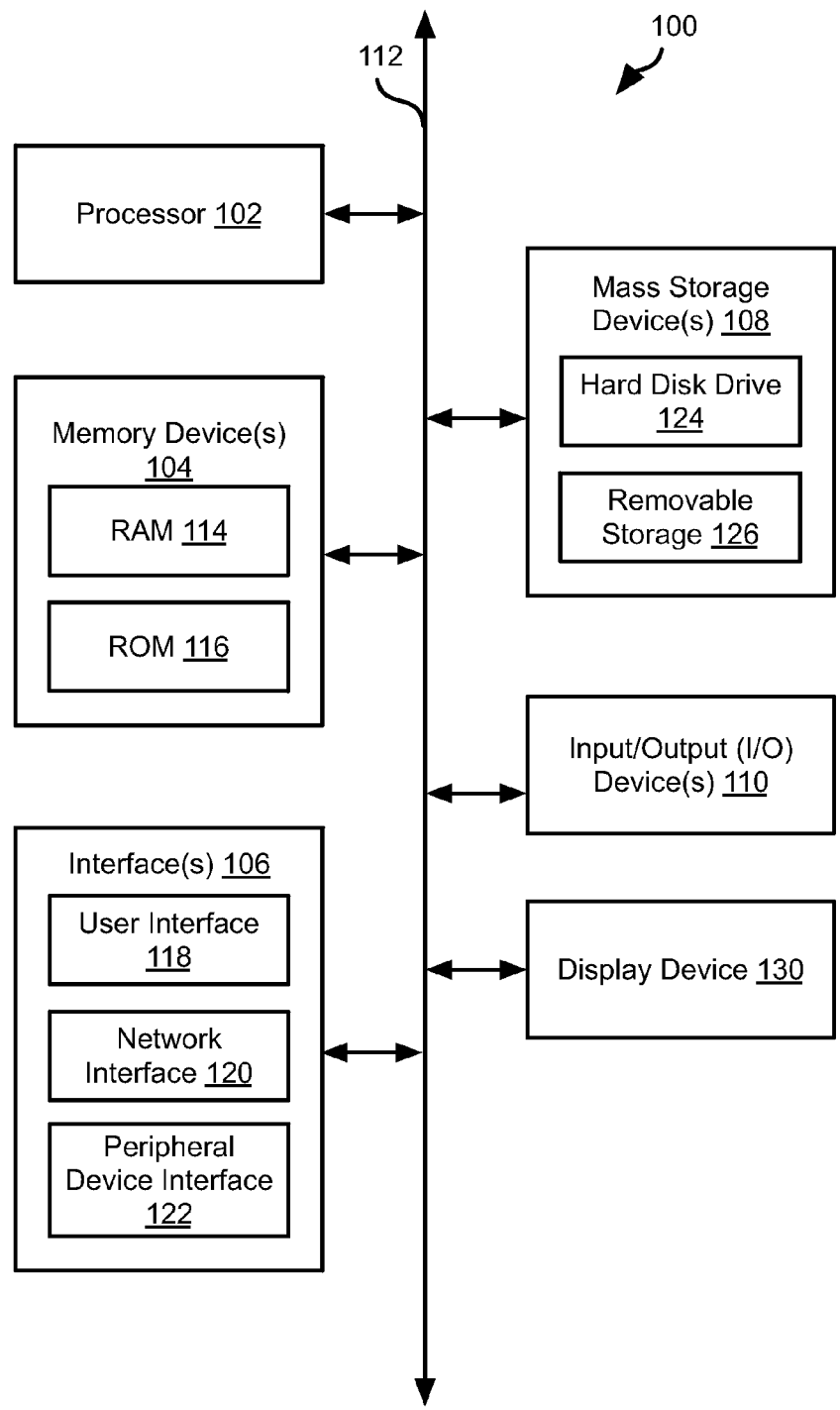
FIG. 1 is a schematic block diagram of a computing system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like. interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
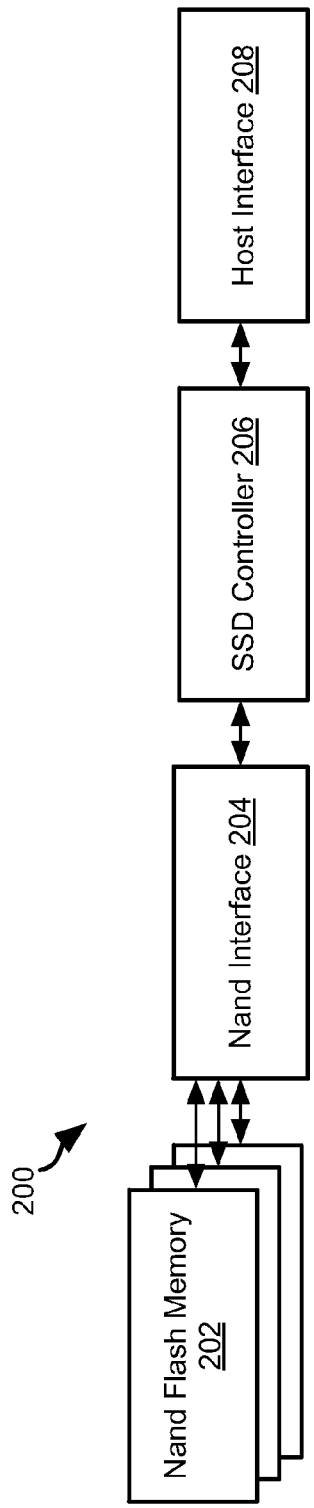
FIG. 2 is a schematic block diagram of a components of a storage system in accordance with the prior art.

Referring to FIG. 2, in some embodiments, a system 200 including a solid state drive (SSD) 200 may include a plurality of NAND flash memory devices 202. One or more NAND devices 202 may interface with a NAND interface 204 that interacts with an SSD controller 206. The SSD controller 206 may receive read and write instructions from a host interface 208 implemented on or for a host device, such as a device including some or all of the attributes of the computing device 100. The host interface 208 may be a data bus, memory controller, or other components of an input/output system of a computing device, such as the computing device 100 of FIG. 1.

The systems and methods disclosed herein may be implemented by an SSD controller 206 interposed between the host interface 208 and the NAND interface 204. In other embodiments, the NAND interface 204 may implement some or all of the functionality disclosed therein. In still other embodiments, an additional component may be interposed between a conventional NAND interface 204 and SSD controller 206 in order to implement all or part of the functions disclosed herein.

Figure 3:
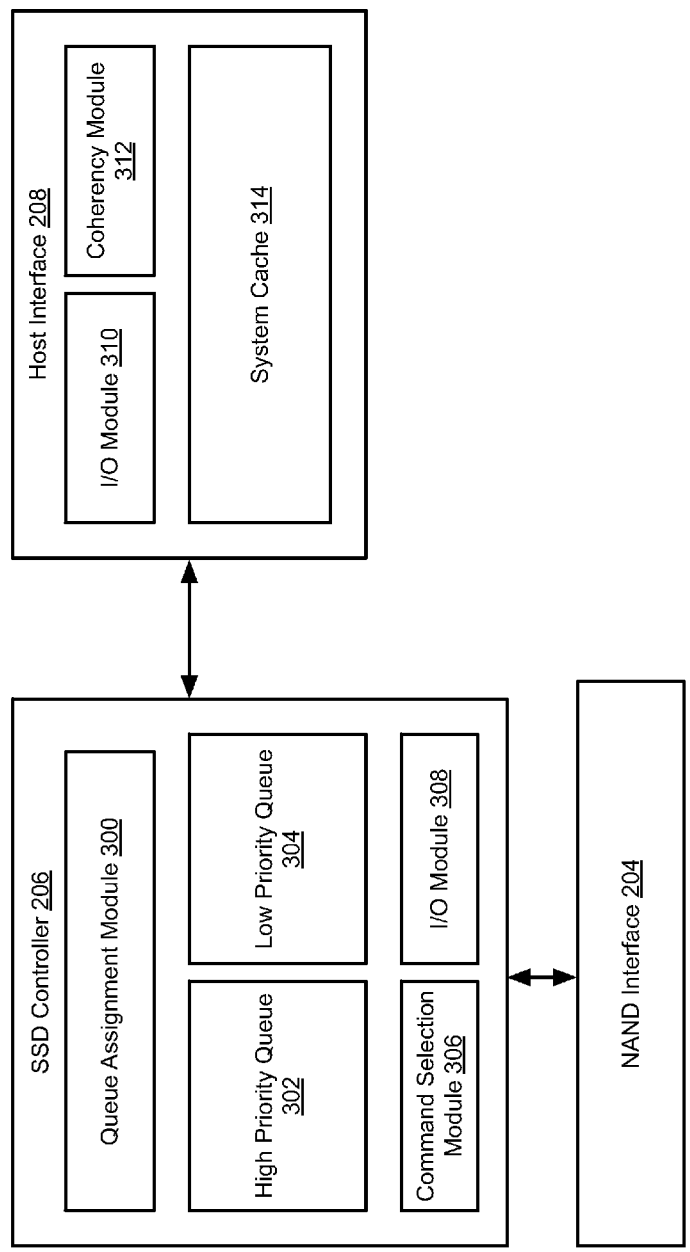
FIG. 3 is a schematic block diagram of components read and write operations in accordance with an embodiment of the present invention.

Referring to FIG. 3, the SSD controller 206 may include a queue assignment module 300 that receives commands from the host interface 208 and assigns them to one of a high priority queue 302 and a low priority queue. In particular, all read commands received from the host interface 208 may be assigned to the high priority queue 302 by the queue assignment module whereas all commands other than host reads are assigned to the low priority queue module. In particular, host write commands are added to the low priority queue 304. The commands other than host reads may be generated internally by the SSD controller 206 or by the host interface 208, such as erase commands or compaction reads performed as part of a garbage collection process.

The queues 302, 304 may be implemented as buffers or other memory device, such as first in first out (FIFO) buffers wherein commands are removed from a queue 302 in the order they were added to the queue 302 and commands are removed form the queue 304 in the order they were added to the queue 304.

A command selection module 306 selects a next command to be executed from one of the queues 302, 304. In particular, if a read command is pending in the high priority queue 302 it will be removed from the high priority queue 302 and executed. If there is no command in the high priority queue 302, a command from the low priority queue 304 is removed therefrom an executed.

The SSD controller 206 may include an input/output module 308 that executes the commands selected from the queues 302, 304. Read commands are executed by requesting data referenced by the read command from the NAND interface 20, receiving the requested data, and returning the requested data to the host interface 208. Likewise, write commands are executed by providing a write instruction to the NAND interface 204 that includes the data and address of the write command. Erase commands are executed by transmitting an erase instruction to the NAND interface 204 that references the block to be erased. The manner by which commands are executed by the I/O module 308 and the types of commands, format of commands, and protocol for transmitting and receiving data in the course of executing commands, may be according to any device or method known in the art of SSD devices or other types of storage devices.

The host interface 208 may likewise include an I/O module 310 that sends commands to the SSD controller 206. The host interface 208 may include a coherency module 312 that determines which commands to send to the SSD controller 206 and/or an ordering in which to send commands to the SSD controller 206. For example, inasmuch as write commands take much longer to execute than read commands in SSD devices, it is possible that a command to write data to a particular address may still be pending when a read command is received for that particular address. Accordingly, the coherency module 312 may return the data of the write command in response to the read command and not transmit the read command to the SSD controller 206. Alternatively, the coherency module 312 may wait until confirmation is received from the SSD controller 206 that the write command is complete before transmitting the read command to the SSD controller 206.

Likewise, where a read command is received that references a particular address and a write command is received that references that particular data before the read command is completed, the coherency module 312 may wait until the confirmation is received from the SSD controller 206 that the read command is complete before sending the write command to the SSD controller 206.

Commands received from a host system by the host interface may be stored in a system cache 314 and sent from the system cache 314 to the SSD controller 206 as determined by the coherency module such that coherency of data is maintained. The coherency module 312 may maintain consistency of data reads and writes in the system cache 314 according to any method known in the art for maintaining cache coherency. In some implementations, the host interface 208 stores a The queues 302, 304 may be queues between host interface 208 and SSD controller 206 via SAS (Serial Attached SCSI (Small Computer System Interface)), SATA (Serial Attached Advanced Technology Attachment), or NVMe (non-volatile memory express) PCIe (peripheral component interconnect express), etc. The standard interface specification for any of these protocols may provide the command queue mechanism to send multiple command to SSD controller 206 within a maximum queue depth and may further permit the definition of multiple command queues. Accordingly, multiple queues 302, 304 may be defined with commands being assigned to the queues as described herein.

Figure 4:
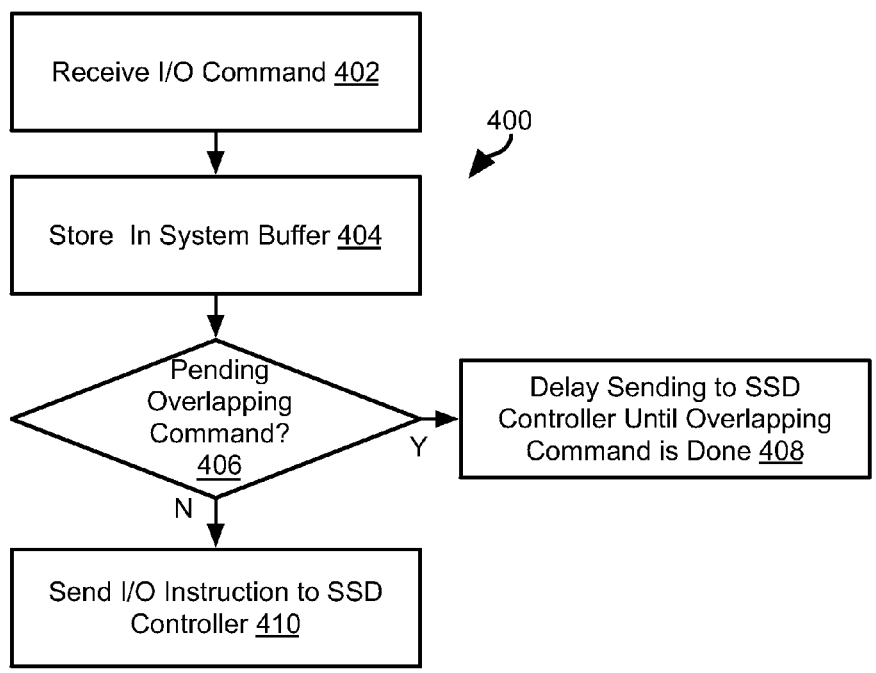
FIG. 4 is a process flow diagram of a method for performing system cache coherency in accordance with an embodiment of the present invention.

FIG. 4 illustrates an example method 400 by which the coherency module 312 may maintain coherency. The host interface 208 may receive 302 an Input/Output (I/O) command, such as a read or write command, from a host system and store 304 the I/O command in the system buffer. If the I/O command is determined 406 to have an overlapping command, then sending of the command to the SSD controller 206 is delayed 408 until a status of the overlapping command indicates completion, at which point the command will be executed. A command may be overlapped if it references the same data as a previously-received and uncompleted command ("the overlapping command"). Specifically, a write command referencing the same address as a previously received and uncompleted read command or a read command referencing the same address as a previously received and uncompleted write command.

As noted above, the method 400 is one example of a method for maintaining cache coherency, but any method known in the art for maintaining cache coherency may be performed.

Figure 5:
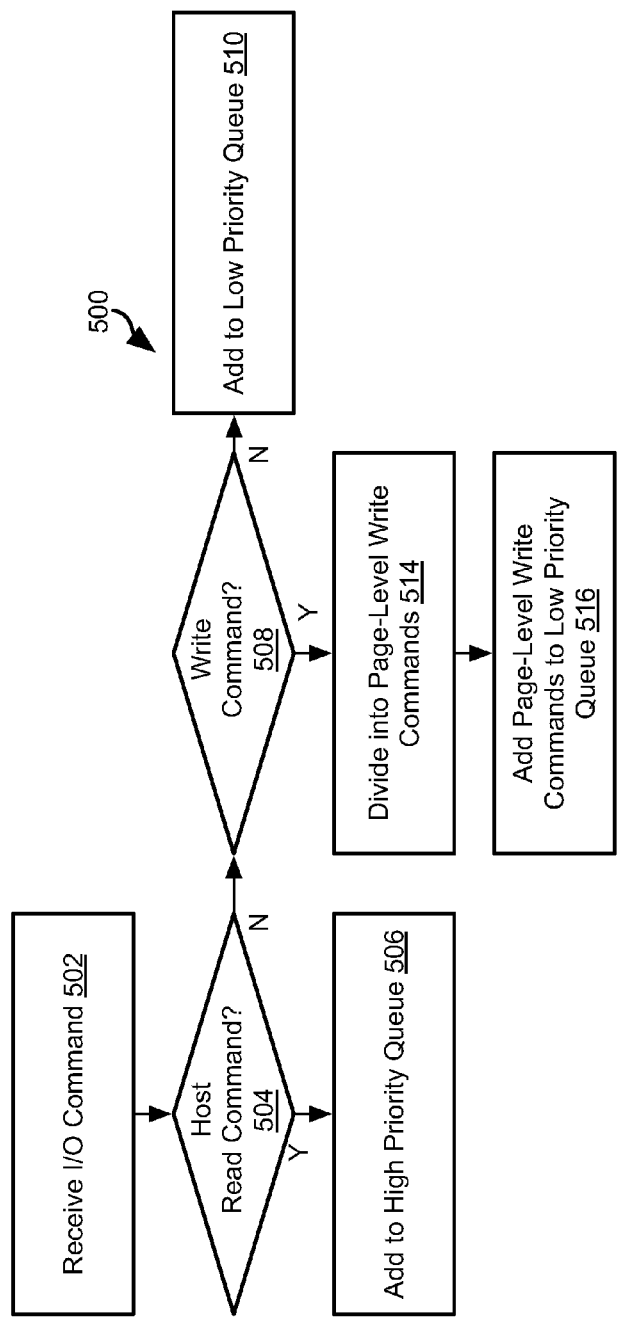
FIG. 5 is a process flow diagram of a method for queuing read and write operations in accordance with an embodiment of the present invention.

Referring to FIG. 5, the illustrated method 500 may be executed by the queue assignment module 300 upon receiving a command from the host interface 208 or an internally generated command, e.g. a command generated as part of a garbage collection or some other management function of the SSD controller 206. For example, the method 500 may include receiving 502 an I/O command from the host interface 208 and evaluating 504 whether the I/O command is a host read command. If so, the I/O command is added 506 to the high priority queue 302. If not, the method 500 may include evaluating 508 whether the I/O command is a write command. If not, the I/O command is simply added 510 to the low priority queue 304. If so, the write command is divided 514 into page-level write commands and these are added 516 to the low priority queue.

In some system, the host interface 208 may accumulate write commands into the amount of data written by the accumulated write commands is equal to a block size within the NAND flash memory 202. A block may be divisible into pages, which are the smallest unit of memory that may be read or written. Accordingly, the SSD controller may divide a write command into a plurality of page write commands in order to avoid long delays from executing an entire block of writes without interruption. This provides the opportunity to execute read commands from the high priority queue 302, thereby reducing latency thereof.

As noted above, a block write command is broken into small pages write commands. However, in some embodiments, these page writes may be "super page size," that includes number of smaller NAND pages. Thus, the dividing of the write command aligns the data in each smaller write command to the logical write super page size boundaries. In some embodiments, if a read command has a size read size is bigger than the super page size, that read command may also be broken up into a number of smaller read commands.

Figure 6:
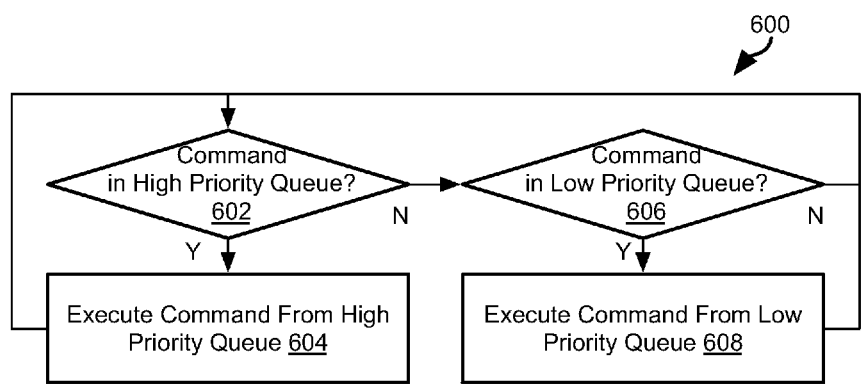
FIG. 6 is a process flow diagram of a method for executing read and write operations from high and low priority queues in accordance with an embodiment of the present invention.

Referring to FIG. 6, the illustrated method 600 may be executed by the command selection module 306 in order to select a next command for execution with respect to the NAND interface 204.

The method 600 may include evaluating 602 whether a command is pending in the high priority queue 302. If so, then the oldest command in the high priority queue 302 is removed from the high priority queue 302 and executed 604, i.e. by reading the requested data from the address referenced in the read command and returning it to the host interface 208. If no command is found 602 in the high priority queue 302, then the method 600 may include evaluating 606 whether a command is pending in the low priority queue. If so, the oldest command in the low priority queue 304 is removed from the low priority queue 304 and executed 608.

As noted above, write commands referencing an entire block of data may be added to the low priority queue 304 as a plurality of page write commands. In this manner following executing of each page write command, the status of the high priority queue 302 will be evaluated 602 such that any host reads received will be interleaved with execution of the page writes, rather than waiting for the entire block of data in the original write command to be written.

The present invention may be embodied in other specific forms without departing from its spirit or essential characteristics. The described embodiments are to be considered in all respects only as illustrative, and not restrictive. In particular, although the methods are described with respect to a NAND flash SSD, other SSD devices or non-volatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

What is claimed is:

1. An apparatus comprising:
a storage device including a non-volatile storage medium; and
a memory device defining a high priority queue and a low priority queue;
a memory controller device programmed to:
receive a sequence of commands from a host device;
for each command of the sequence of commands,
if the each command is a host read command, store the each command in the high priority queue, and
if the each command is a read command from a garbage collection process, store the each command in the low priority queue;
process the high priority queue and low priority queue by:
if the high priority queue is not empty, executing an oldest command in the high priority queue, and
if the high priority queue is empty, executing an oldest command in the low priority queue;
wherein the memory controller is further programmed to, if the each command is a write command, add a plurality of partial write operations to the low priority queue, each partial write operation including a portion of data in the each write command;
wherein the each write command includes a block of data and wherein each partial write operation includes one page of data from the block of data.

2. The apparatus of claim 1, further comprising a host device including one or more host processing devices programmed to buffer write requests until a full block of write requests have been received and send the write command to the memory controller device with the full block of write requests.

3. The apparatus of claim 1, wherein the storage medium is a NAND flash storage device and each block of data is a size of a NAND flash block of memory in the NAND flash storage device.

4. The apparatus of claim 1, wherein the memory controller device is coupled to one or more NAND flash devices.

5. The apparatus of claim 1, wherein each command that is not a host read command is one of a host write operation, an erase command, and a compaction read command.

6. An apparatus comprising:
a storage device including a non-volatile storage medium; and
a memory device defining a high priority queue and a low priority queue;
a memory controller device programmed to:
receive a sequence of commands from a host device;
for each command of the sequence of commands,
if the each command is a host read command, store the each command in the high priority queue, and
if the each command is a read command from a garbage collection process, store the each command in the low priority queue;
process the high priority queue and low priority queue by:
if the high priority queue is not empty, executing an oldest command in the high priority queue, and
if the high priority queue is empty, executing an oldest command in the low priority queue; and
a host device including one or more host processing devices programmed to manage coherency between each command of the sequence of commands and any overlapping commands of the sequence of commands.

7. The apparatus of claim 6, wherein the memory controller device is further programmed to refrain from managing coherency between commands of the sequence of commands.

8. The apparatus of claim 7, wherein the host device implements a host cache and wherein the host device sends the sequence of commands to the memory controller device from the host cache.

9. A method comprising:
receiving, by a storage device controller, a sequence of a plurality of commands, each command of the plurality of commands being one of a host read operation and a command other than a host read operation, each command other than the host read operation including at least one of a host write operation and a command other than a host read and host write operation;
adding, by the storage device controller, each host read operation to a first queue;
adding, by the storage device controller, each command other than the host read operation to a second queue;
processing, by the storage device controller, the first and second queues by executing any host read operation in the first queue prior to any command other than the host read operation in the second queue;
for each host write operation adding a plurality of partial write operations to the second queue, each partial write operation including a portion of data in the host write operation; and
wherein the each host write operation includes a block of data and wherein each partial write operation includes one page of data from the block of data.

10. The method of claim 9, further comprising for each command that is a write command, buffering a plurality of write request until the plurality of write requests include the block of data and then send the write command to the storage device controller with the full block of write requests.

11. The method of claim 9, wherein the storage device controller is coupled to a NAND flash storage device and each block of data is a size of a NAND flash block of memory in the NAND flash storage device.

12. The method of claim 9, further comprising:
managing coherency between each command of the plurality of commands and any overlapping command of the plurality of commands by a host system that generated the plurality of commands.

13. The method of claim 12, further comprising refraining from managing coherency between each command of the plurality of commands and any overlapping command of the plurality of commands by the electronic storage device controller.

14. The method of claim 13, wherein the host system implements a host cache and wherein the host system sends the plurality of commands to the memory controller device from the host cache.

15. The method of claim 9, wherein the storage device controller is coupled to one or more NAND flash devices and wherein executing any host read operation in the first queue prior to any command other than the host read operation in the second queue comprises executing any host read operation and any command other than the host read operation with respect to the one or more NAND flash devices.

16. The method of claim 9, wherein the command other than a host read and host write operation include at least one of an erase command and a compaction read command.

* * * * *